March 26, 1929.  W. A. GEIGER  1,706,446
HAND BRAKE
Filed Aug. 6, 1926
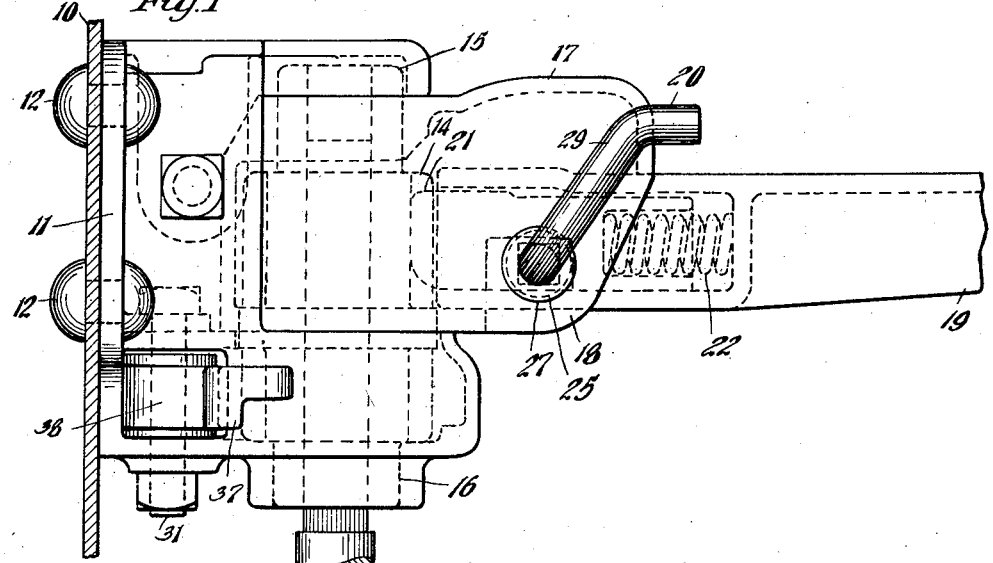
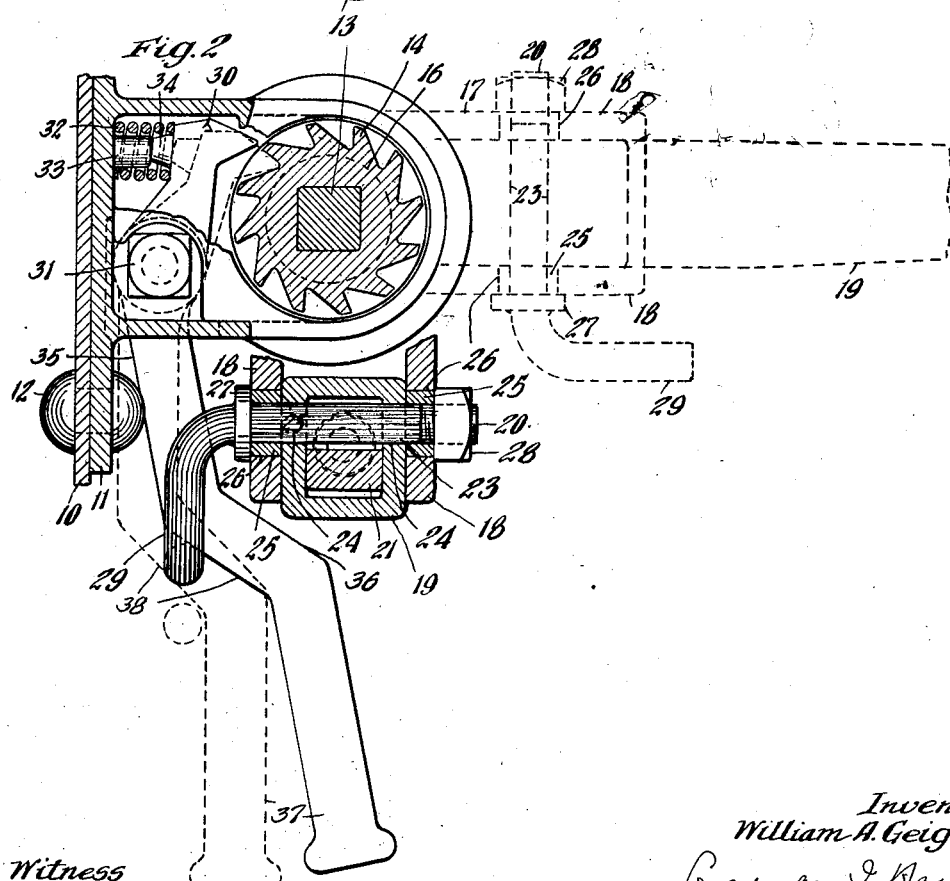
Inventor
William A. Geiger Patented Mar. 26, 1929.

1,706,446

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

HAND BRAKE.

Application filed August 6, 1926. Serial No. 127,497.

This invention relates to hand brakes.

In the operation of hand brakes of the vertical staff type in which means are provided for rotating the staff to wind the brake chain thereon, ratchet mechanism is also provided for preventing accidental reverse rotation of the staff, and when it is desired to release the brakes, the release lever of the ratchet mechanism must be disconnected and held out of engagement until the brake chain has unwound sufficiently to release the brake shoes, and immediately the lever is released the same resumes its normally engaged position with the ratchet associated with the staff, thereby preventing any further reverse rotation of the staff. Due to various reasons the release ratchet is frequently permitted to resume its engaged position with the brake staff before the same has unwound sufficiently to fully release the brake shoes, thereby resulting in incomplete unwinding of the brake chain from the staff and dragging of the brake shoes upon the wheels with consequent great wear upon the parts and increased tractive effort by the locomotive.

The purpose of the present invention is to provide means for locking the release lever in disengaged position to permit full unwinding movement of the brake staff, said means being of a character whereby the swingable drop handle associated with the actuating mechanism for rotating the staff to take up the brake chain, is provided with an arm movable with said handle and arranged to cooperate with the release lever, so that in one position of the parts, when the handle is dropped so as to release the brake staff, the arm on said handle engages the release lever in such manner as to cam the same to, and hold it in, fully released position to permit unimpeded unwinding of the brake chain from the brake staff, said release lever being again freed when the drop handle is elevated into position to operate the actuating mechanism.

Other and further objects of the invention will more fully clearly appear from the description and claims hereinafter following.

In the drawing, forming a part of this specification, Figure 1 is a side elevational view of the brake, showing a fragment of the end wall of the car in section, portions of the construction being broken away to better accommodate the view to the sheet. Figure 2 is a horizontal sectional view through the end wall of the car, showing the operating handle of the brake mechanism in full lines in position to hold the release lever out of engagement, and the operating mechanism and release lever being shown in dotted lines when the same are in position to permit the usual operation of the brake, and also in position just prior to engagement between the parts to effect retraction of the release lever.

Referring to the drawing, the end wall of the car is indicated at 10, to which is secured a housing or bearing bracket designated generally by the reference character 11. The housing 11 is secured to the wall 10 by suitable rivets 12—12, and projecting into the housing is the usual vertical brake staff, a portion of which is indicated at 13, the staff having a square or other non-circular cross section at the top thereof on which is fitted the ratchet wheel 14. The ratchet wheel is suitably mounted in the housing for rotation upon journals, indicated at 15 and 16. Oscillatably mounted upon the bearing bracket 11 is a carrier or fulcrum member designated generally by the reference character 17. The carrier 17 is provided with spaced wings 18—18, between which is pivotally mounted the operating handle 19 by means of a member 20 of a peculiar character hereinafter referred to more in detail. The handle 19 is provided at the inner end thereof with a socket in which is slidably mounted a pawl 21 normally impelled outwardly by means of a spring 22. The arrangement of the handle and pawl is such that when the handle is elevated to a horizontal position, as shown in full lines in Figure 1, the pawl is operatively engaged with the ratchet wheel 14, so that oscillation of the handle 19 imparts rotation to the staff 13 in a direction to take up the brake chain, and when the handle 19 is released, it automatically falls of its own weight to a depending vertically arranged inoperative position. All the above described mechanism is old and well known and no claim is made thereto except in conjunction with the novel means for utilizing the operating handle to cooperate in effecting full unwinding of the brake staff.

The member 20 is utilized for pivotally mounting the operating handle 19 between the wings 18—18 of the operating mechanism. As best seen in Figure 2, the member 20 is provided with a portion 23 which is preferably square in cross section, said portion extending through square openings 24 in the handle 19, so that rotation of the member 20, with reference to the handle 19, is prevented. Annular bearing members 25—25 are fitted over the square portion 23 of the member 20 at each side of the handle 19 when the same is in position, said annular bearing members being journaled in annular bearing openings 26—26 provided in the wings 18—18. The member 20 is provided with a stop 27 adapted to abut against the outer surface of one of the wings 18, while the opposite end of the squared portion 23 is threaded for the reception of a nut 28 which maintains the member 20 in position. The member 20 is provided with an integral angular extension 29 which is so disposed as to cooperate with the release lever of the brake in a manner hereinafter referred to, it being understood that swinging of the operating handle 19 from a horizontal to a vertical position, and vice versa, effects corresponding swinging movement of the angular extension 29 due to the engagement of the squared portion 23 of the member 20, with the handle 19, while free swinging of said handle is permitted by oscillation of the annular bearing members 25—25 in the annular bearings provided therefor.

To hold the staff 13 against retrograde rotation, a locking dog 30 is provided, which is pivotally mounted upon a bolt 31 in the housing 11, said dog being adapted to normally engage the ratchet wheel 14 under the influence of a coiled spring 32, one end of which is disposed about the lug 33 formed on the inner wall of the housing, and the opposite end of which is disposed about a lug 34 formed on the end of the dog 30.

Forming part of the dog 30 is a release lever 35, said lever including an inclined portion 36 which extends outwardly from the wall 10 a suitable distance, the lever 35 being provided with a handle portion 37 which extends substanially parallel with the lever portion 35. The inclined portion is of such character, that when the dog is in operative engagement with the ratchet wheel, and the operating mechanism of the brake, with the handle 19 in its raised or horizontal position is swung, to the limit of its movement in a clockwise direction, and the operating handle is dropped, the extension 29 is in line with the outer portion of the cam face 38 provided by the inclined portion 36, so that downward movement of the lever will cause a camming action between these parts resulting in the retraction of the dog 30, and locking thereof in retracted position which permits free unwinding of the brake staff 13, elevation of the operating handle moving the extension 29 to permit resumption of its normal position.

In operation, assuming the parts of the mechanism to be in the position shown in full lines in Fig. 1 and in dotted lines in Fig. 2 and it is desired to tighten the brakes, the operating handle 19, which normally is in depending position, but when elevated as shown, effects engagement of the pawl 21 with the ratchet wheel 14 under the influence of the spring 22, whereby oscillation of the handle 19 in a horizontal plane effects rotation of the brake staff 13 in a clockwise direction. When the parts are in this position, the dog 30 under the influence of the spring 34, is in engagement with the ratchet wheel 14 as shown in dotted lines in Fig. 2, thereby preventing retrograde movement of the staff when the brake chain is being taken up. When it is desired to automatically release the brake, the operating handle 19 is depressed to disengage the pawl 21 and the handle swung in a clockwise direction to the limit of its movement, and when the handle 19 is dropped, the extension 29 will first engage the outer portion of the cam face 38, and continued descent of said handle will cause the extension 29 to ride along the cam face 38 to the position shown in full lines, Figure 2, thereby automatically releasing the dog 30, the parts being maintained in interlocked engagement until manually released, so as to permit unimpeded unwinding of the brake chain from the staff. The brake also may be released by first dropping the handle 19, pulling the handle portion to release the dog after the handle 19 may be again raised, moved to the left as shown in Figure 2, and dropped, thereby camming the release lever 35 in a counter-clockwise direction to retract the dog 30 from engagement with the ratchet wheel. When it is again desired to operate the brake, the handle 19 is elevated freeing the dog 30 to permit engagement with the ratchet wheel, and causing engagement of the pawl 31 therewith, after which the brake may be operated as before described. It should also be observed that if desired, the brake may be operated in a manner customary in brakes of this character by dropping the handle 19 in such position that the extension 29 will not come into contact with the release lever, and in this case the release lever must be released by manually pulling upon the handle 37 in the ordinary manner.

While I have herein shown and described what I now consider the preferred manner of carrying out the invention, the same is merely illustrative, and I contemplate all changes and modifications that come within the scope of the claims appended hereto.

I claim:

1. In a hand brake, the combination with a rotatable brake winding member; of a toothed element carried by said member; an oscillatable member; a drop handle pivotally carried by said oscillatable member and having pawl means adapted to engage said toothed member when elevated, and to be disengaged when dropped, said handle being provided with an extension adapted to partake of the movements of said handle, said extension having a finger spaced from the side of the drop handle and substantially parallel thereto; a pivotally mounted dog; and spring means normally urging said dog into engagement with said toothed member to prevent retrograde rotation thereof, said dog being provided with cam means adapted to be engaged by the finger of said extension when the handle is dropped to thereby effect automatic retraction of said dog from engagement with said ratchet wheel.

2. In a hand brake, the combination with an element adapted to be rotated to effect tightening of the brake rigging; of a carrier adapted to oscillate about the axis of said tightening element; an operating member having a pivotal connection with said carrier, said connection including a member fixed with reference to said operating member and rotatably supported by said carrier, said member being provided with an angular extension projecting outwardly from said operating member; and holding means arranged normally to prevent retrograde rotation of said element, said extension being adapted to cooperate in certain positions of the parts to retract said holding means from its holding position.

In witness that I claim the foregoing I have hereunto subscribed my name this 28th day of July, 1926.

WILLIAM A. GEIGER.